United States Patent [19]

Lynne

[11] Patent Number: 4,908,130
[45] Date of Patent: Mar. 13, 1990

[54] AUTOMOBILE GASOLINE IMPURITIES REMOVAL APPARATUS

[75] Inventor: Mark Lynne, Valley Stream, N.Y.

[73] Assignee: Empire Research and Development Corporation, New York, N.Y.

[21] Appl. No.: 105,990

[22] Filed: Oct. 6, 1987

Related U.S. Application Data

[63] Continuation-in-part of Ser. No. 864,491, May 19, 1986, abandoned.

[51] Int. Cl.⁴ .............................................. B01D 35/02
[52] U.S. Cl. .................................... 210/172; 210/454; 210/463; 210/475; 210/479
[58] Field of Search ............... 210/172, 232, 241, 244, 210/437, 438, 447, 448, 449, 452, 454, 460, 463, 474, 475, 479; 220/85 F, 86 R, 254, DIG. 33

[56] References Cited

U.S. PATENT DOCUMENTS

| | | | |
|---|---|---|---|
| 1,218,975 | 3/1917 | Brison | 210/452 |
| 1,451,136 | 4/1923 | Allnutt | 220/86 R |
| 1,976,975 | 10/1934 | Williams | 210/172 |
| 2,162,043 | 6/1939 | Westlund et al. | 210/452 |
| 2,765,948 | 10/1956 | Paley et al. | 220/254 |
| 4,265,752 | 5/1981 | O'Banion | 210/452 |
| 4,529,097 | 7/1985 | Larson | 220/85 F |

Primary Examiner—W. Gary Jones
Assistant Examiner—Matthew Savage
Attorney, Agent, or Firm—Howard F. Mandelbaum

[57] ABSTRACT

A gasoline filter for the entranceway to a gas tank filler tube has three preferred embodiments. The first includes a semipermanently mounted cap having a bore in which there is disposed a removable cylindrical filter element. The element is seated on a rotatable retainer for alignment with an eccentric opening in the filler tube entranceway. Normally closed resiliently mounted doors seal the entranceway but permit a gas pump nozzle to be inserted into the entranceway. The second embodiment has an integral hinged door atop the filter element for use with a conventional gas cap. The third embodiment has dual hinged doors mounted within the bore of the filter element arranged to be opened automatically by a pusher bushing when a gasoline dispensing nozzle is inserted in the gas tank filler tube.

13 Claims, 2 Drawing Sheets

AUTOMOBILE GASOLINE IMPURITIES REMOVAL APPARATUS

BACKGROUND OF THE INVENTION

This application is a continuation-in-part of patent application serial no. 06/864,491, now abandoned.

It is known that gasoline refined for use in automobiles often contains impurities when it leaves the refining plant or acquires impurities in the distribution channel or in the tanks in which it is stored prior to being pumped into the gas tank of an end user's automobile. Automobile manufacturers attempt to compensate for this potentially damaging circumstance by including filters in automobiles for the removal of solid particles from gasoline used in the fuel systems of their automobiles.

Typically, a filter is located at two points in the fuel system of an automobile. A gas tank filter is often provided at the juncture between the automobile's gasoline tank and the fuel line through which gasoline is pumped by the fuel pump to the engine. A second filter is usually found at or in the inlet to the the fuel and air mixing system, be it a carburetor inlet in cars with conventional carburetion systems or the point where gasoline is distributed from the fuel line to the injectors in fuel injected vehicles.

Both of the above schemes of gas filtration suffer from the fact that removal of contaminating impurities from gasoline does not begin to occur until the gasoline has entered the automobile. Hence, the gas tank of the automobile is subject to contamination which, if permitted to reach excessive levels or to continue for a long enough period, can clog the fuel line or the above mentioned filters thereby blocking the flow of fuel to the engine. Worse, the other filters may be overcome thereby allowing impurities to enter the carburetor, fuel injectors or engine and cause disabling and expensive damage.

SUMMARY OF THE INVENTION

The present invention teaches a construction for an automobile fuel filter which can be semipermanently installed at the mouth of the entranceway to the fuel tank of an automobile for trapping solid particles in gasoline as it exits the pump at the filling station before they can enter the car's gasoline tank and become a potential source of damage to the vehicle. More specifically, the invention provides for an automobile gasoline filter having an aperture adapted to receive the nozzle of a gasoline pump and a shoulder adapted for seating on the entranceway to the filler tube of an automobile gas tank, filtration means having a downwardly extending cylindrical mesh wall, and support means affixed to the filtration means at the distal end thereof for maintaining the shape of a bore through the filtration means whereby gasoline from the pump enters the bore of the filtration means and then flows through the wall into the gas tank of the automobile while filtered particles remain within the bore.

In one embodiment of the invention, there is provided a gas cap adapted to be releasably secured to the gas tank entranceway, the cap means including an axial bore having a proximal end adapted to receive the spout from the gasoline pump and a distal end proximate the proximal end of the filter, the bores of the cap means and filter being in substantial alignment for permitting gasoline exiting from the gasoline pump nozzle into the cap means to enter the bore of the filter, the bore in the cap means being eccentrically disposed and the filter being rotatable relative to the axis of the cap for permitting alignment between the respective bores in the cap and filter by mutual relative rotation.

In a second embodiment of the invention an integral door is hinged to the top of the filter assembly to permit use with a conventional gas tank cap.

In a third embodiment of the invention two coplanar doors are hinged to a pin disposed in the bore of the filter assembly to permit them to be opened automatically upon insertion of a standard gasoline dispensing nozzle. Use with a conventional gas tank cap is also permitted.

It is therefore an object of the invention to filter impurities from gasoline before they enter the gas tank of an automobile.

Another object of the invention is to provide an inexpensive filter which can be readily inspected and replaced.

Still another object of the invention is to provide apparatus for releasably sealing the entranceway to an automobile gas tank to keep out impurities and prevent evaporation while permitting a filter element to be disposed in the entranceway.

A further object of the invention is to provide a single filter apparatus which can be mounted on the entranceway to gas tanks having openings eccentrically disposed at varying angles.

Other and further objects of the invention will be apparent from the accompanying drawings and description of three preferred embodiments of the invention in which like reference numerals are used to indicate like parts in the various views.

DESCRIPTION OF THE PREFERRED EMBODIMENTS

Figure 1:
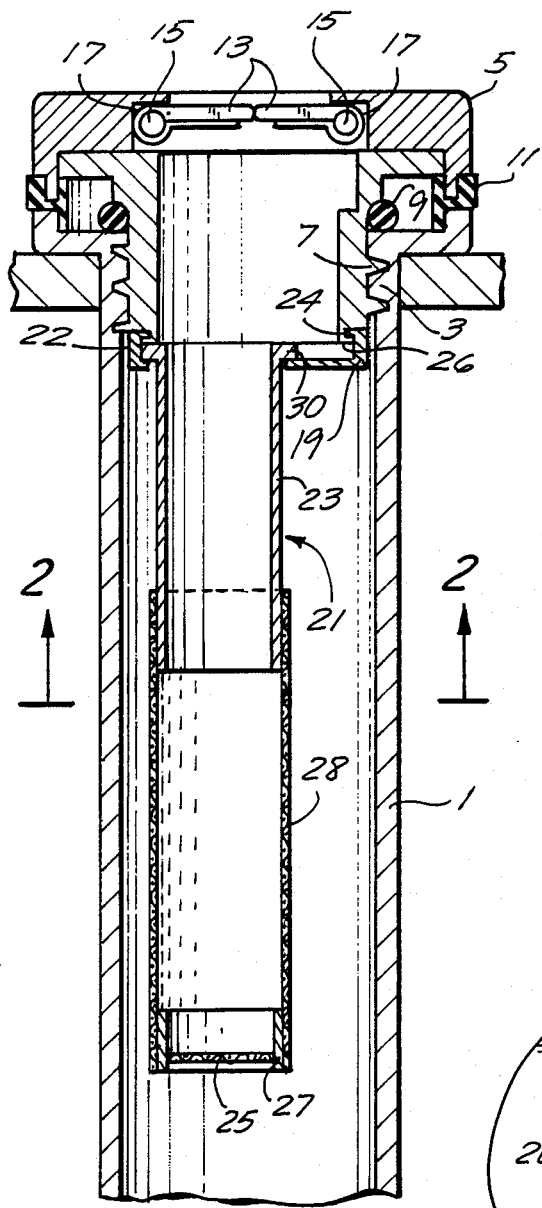
FIG. 1 is a sectional elevation view of a first preferred embodiment of the invention in its intended environment.

Referring now to the drawings there is shown a conventional filler tube 1 leading to the gas tank (not shown) of an automobile. The upper end of the filler tube 1 has internal threads 3 for engagement with the external threads on a standard gas cap.

Replacing the standard gas cap, there is shown a gas cap 5 with an upper member which also has external threads 7 mating with the internal threads 3 in the neck of the upper end of the filler tube 1. The upper portion of the upper member of the gas cap 5 has an enlarged diameter while the lower portion which carries the external threads 7 has a smaller diameter thereby defining a shoulder on the underside of the upper portion of the gas cap 5 on which there are concentrically mounted an inner O-ring 9 and a radially spaced outer gasket 11. Both the O-ring 9 and gasket 11 are made of a stiff resilient rubber in the preferred embodiment of the invention although other compressible materials suitable for use as a seal will be known to those skilled in the art.

The O-ring 9 and gasket 11 engage the shoulder of a flange seated atop the upper end of the filler tube 1 and are compressed to form a seal between the gas cap 5 and filler tube 1 as the gas cap 5 is threaded onto the filler tube 1. Unlike a conventional gas cap, the gas cap 5 is normally not removed from the filler tube 1 once it is threaded into place, except for maintenance purposes. Instead the gas cap 5 is adapted to permit gasoline to flow from the nozzle of a gas pump into the filler tube 1 without its removal.

The uppermost end of the gas cap 5 is provided with an aperture leading to a circular bore in the gas cap 5. Disposed in the upper portion of the bore of the gas cap 5 are opposing planar doors 13 which are rotatably mounted about respective pivot pins 15. Springs 17 normally urge the doors 13 into a coplanar position obstructing the bore of the gas cap 5. The springs 17 yield to pressure exerted on the doors 13 when the gas pump nozzle is inserted into the bore of the gas cap 5 causing the doors 13 to swing downwardly and outwardly while the nozzle is received in the bore of the gas cap 5.

A lower member of the gas cap 5 includes a circular retainer 19 rotatably mounted on the underside of the lower end of the upper member of the gas cap 5. The circular retainer 19 is in the form of a circular disk and has an eccentric circular aperture 20. A shallow circular wall 22 extends upwardly from the circumference of the circular retainer 19 and is provided at its top with an inwardly extending shoulder 24 thereby forming a channel in which a circular rib 26 on the lower outer circumference of the gas cap 5 is received. Hence the gas cap 5 and circular retainer 19 are substantially axially fixed but relatively rotatable with respect to one another.

A filter element 21 has an upper support means in the form of a ring 23 at its proximal end and an axially spaced lower support means in the form of a ring 27 at its distal end, both of which are circumscribed by a hollow cylindrical mesh 28. The mesh 28 is preferably made of nylon or a similar material and has apertures no larger than the size of particles to be filtered from the gasoline.

The upper ring 23 is in the form of a hollow cylinder of uniform diameter except for a radially outwardly extending circular flange 30 at its uppermost end. The shoulder formed on the underside of the flange of the upper ring 23 engages the upper surface of the circular retainer 19 adjacent its aperture 20 when the lower ring 27, mesh 28 and narrower circumferential portion of the upper ring 23 are inserted through the aperture 20 in the circular retainer 19 for removably mounting the filter element 21 in the filler tube 1 of the automobile.

The lower ring 27 is formed from a hollow cylindrical sleeve the outer circumference of which is circumscribed by the mesh 28. The mesh 28 may be affixed to the upper ring 23 and lower ring 27 by a conventional adhesive or other known means of affixation. Seated on the uppermost surface of the lower ring 27 is a circular disk 25 formed of the same material as the cylindrical mesh 28.

Eccentric mounting of the aperture 20 in the circular retainer 19 and the ability of the circular retainer 19 to be rotated with respect to the gas cap 5 permit the aperture 20 in the circular retainer 19 to be aligned with the opening in the entranceway to the filler tube 1 which is commonly eccentrically disposed at varying angles from vehicle to vehicle.

In use, the gas cap 5 is semipermanently mounted atop the filler tube 1 of the automobile gas tank with the aperture 20 in the circular retainer 19 rotated into alignment with the opening in the filler tube 1. The filter element 21 is then inserted with the mesh 28 passing through the aperture 20 in the circular retainer 19 until the underside of the circular flange on the upper ring 23 is seated atop the circular retainer 19. The filter element 21 may be periodically removed for inspection and replacement as necessary.

Figure 3:
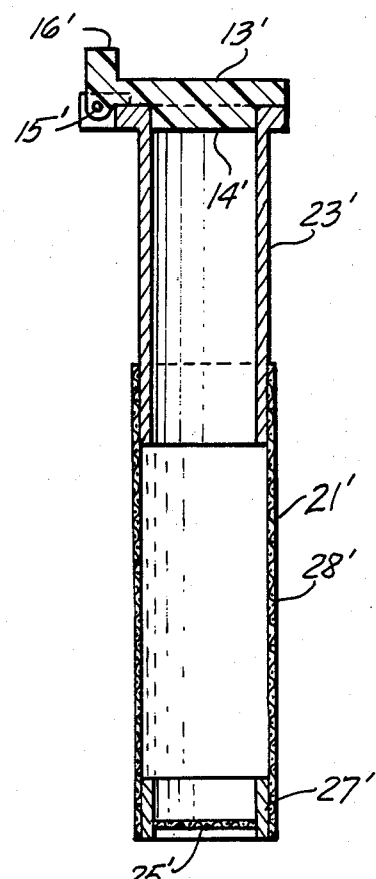
FIG. 3 is a sectional elevation view of a second preferred embodiment of the invention.

Referring now to FIG. 3 of the drawings, there is shown a second preferred embodiment of the invention which can be used with a conventional gas cap (not shown). A filter element 21' includes a cylindrical mesh 28' affixed to an upper ring 23' and a lower ring 27' as in the first embodiment illustrated in FIGS. 1 and 2. A circular disk filter mesh 25' is also mounted in the bore of the lower ring 27'.

A door 13' is rotatably mounted on the upper end of the upper ring 23' with a connecting hinge pin 15'. The door 13' has, on its underside, a circular projecting portion 14' disposed in the bore of the upper ring 23' for sealing it when the door 13' is in its fully Closed position as shown in FIG. 3.

For opening the door 13', e.g., when the gas tank is to be filled, there is provided on the upper surface of the door 13', a rectangular ridge 16' running along the edge of the door parallel to the hinge pin 15'. Downward and rearward pressure on the ridge 16' causes the door 13' to rotate upwardly to its open position. The door 13' is held in its open and closed positions by friction and gravity.

Figure 2:
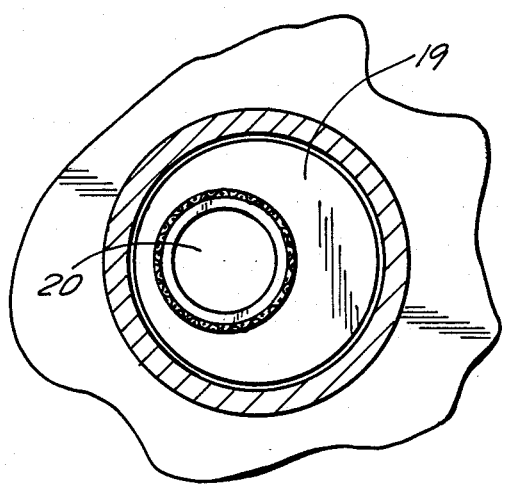
FIG. 2 is a sectional plan view of the first preferred embodiment of the invention.

Use of the filter element 21' obviates the need for a special gas cap with its own door(s) as in the case of the first embodiment of FIGS. 1 and 2. The door 13' substitutes for the spring loaded normally closed door found in the entranceway of the filler tube 1 which must be kept open to permit admission of the filter element 21' into the filler tube. Hence, a conventional gas cap can be used with the filter element 21' of the embodiment of FIG. 3.

Figure 4:
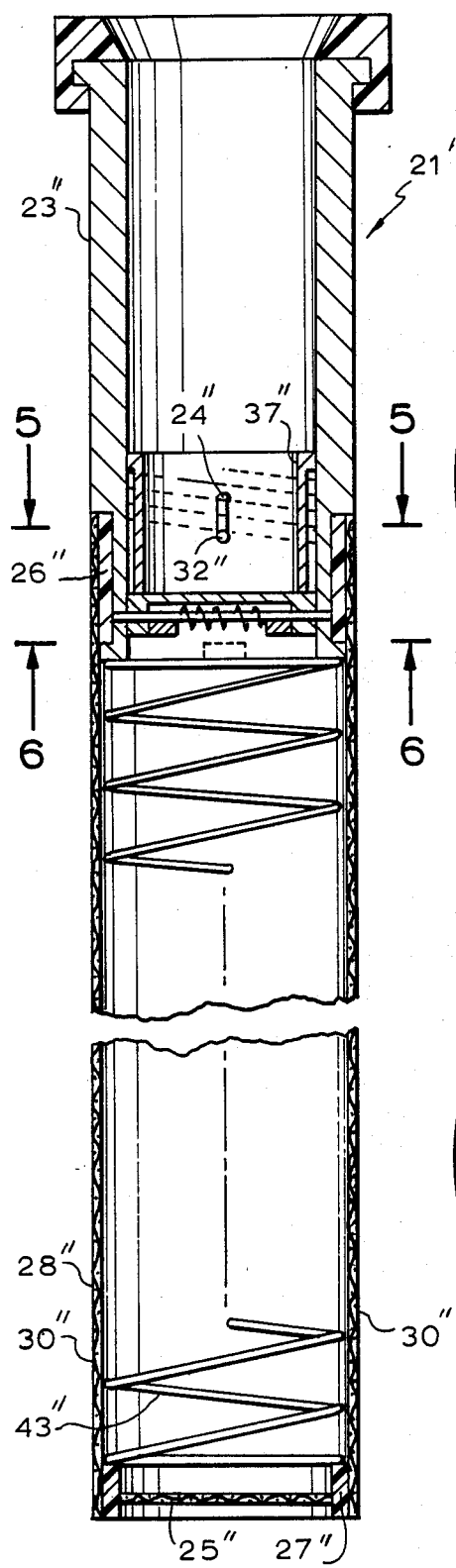
FIG. 4 is a sectional elevation view of a third preferred embodiment of the invention.
Figure 5:
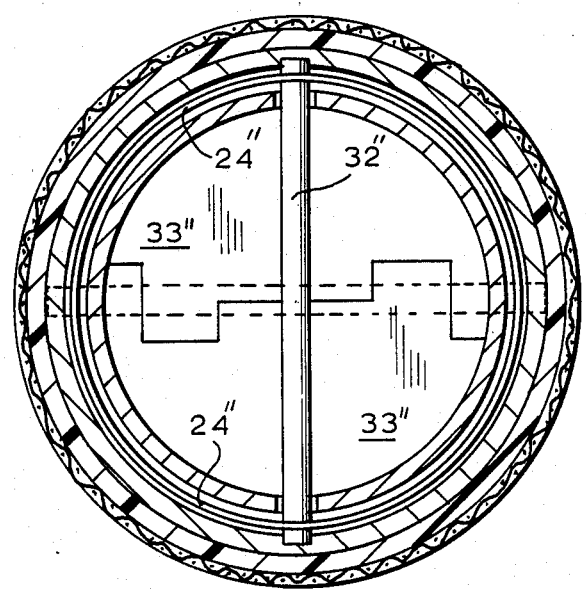
FIG. 5 is a cross sectional view of the third preferred embodiment of the invention taken through line 5—5 of FIG. 4.
Figure 6:
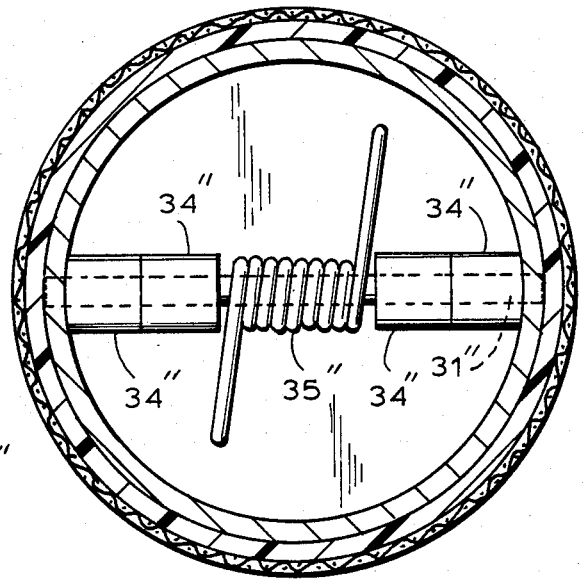
FIG. 6 is a cross sectional view of the third preferred embodiment of the invention taken through line 6—6 of FIG. 4.

Referring now to FIGS. 4, 5 and 6 of the drawings, there is shown a third preferred embodiment of the invention which can be also be used with a conventional gas cap (not shown). A filter element 21" includes a cylindrical mesh 28" circumscribing an open cylindrical mesh support body 26"" having upper and lower rings 26" and 27" respectively, both of which are integrally connected to four parallel circumferentially spaced axial members 30".

The mesh 28" covers the spaces between the four parallel circumferentially spaced axial members 30". A circular disk filter mesh 25" is also mounted in the bore of the filter 21" atop the lower ring 27".

Mounted within the bore of the upper ring 23" is a pivot pin 31" with ends inserted into the wall of the ring 23". Rotatably mounted on the pin 31" are two door members 33" and a coiled spring 35" the extended ends of which urge the door members 33" into a coplanar position substantially obstructing the bore in the upper ring 23". The door members 33" each have two integral hinges 34" bored to receive the hinge pin 31".

A cylindrical bushing 37" with a circular shoulder on its uppermost end is slidably mounted within the bore in the upper ring 23". The bushing 37" has two diametrically opposite axial running slots in and open at the bottom of its circumferential wall which permit the bushing 37" to, move partially downwardly without interference from the pivot pin 31" to open the doors 33" as will be subsequently explained.

The bushing 37" also has two diametrically opposite axial running closed slots in its circumferential wall which are displaced ninety degrees (90°) from the open slots to receive a pin 32" which allows limited longitudinal movement of the bushing 37" parallel to axis of the filter and keeps it captive within the bore of the upper ring 23".

Disposed in the space between the outer circumferential wall of the bushing 37" and the inner circumferential wall of the upper ring 23" and compressed between the underside of the shoulder on the upper end of the bushing 37" and the ends of the captive pin 32" is a helical spring 24".

The diameter of the shoulder of the bushing 37" is approximately equal to the diameter of a standard gasoline pump nozzle suitable for dispensing unleaded gasoline. The outer circumference of the shoulder of the bushing 37" is also slightly less than the inner diameter of the upper ring 23" so that lateral movement is substantially prevented while friction is low enough to allow free longitudinal movement of the bushing 37" within the bore of the upper ring 23".

The door members 33" have upper planar surfaces against which the lower end of the fingers of the bushing 37", defined by the open slots therein, rest. Upon insertion of a gas pump nozzle into the filter assembly of FIG. 4, the end of the nozzle urges the bushing 37", which acts as a pusher means, downward against the door members 33" and opposed by the compressed spring 24" thereby forcing the door members 33" to rotate symmetrically downward about pivot pin 31" into spaced planes approaching parallelism with the axis of filter assembly 21", the open position permitting flow of gasoline from the nozzle of the pump through the filter mesh 25" into the automobile gas tank. When the nozzle of the gas pump is withdrawn the spring 35" restores the door members 33" to their former planar position and the compressed helical spring 24" restores the bushing 37" to its uppermost position.

The door members 33" each have a substantially planar portion of semicircular shape to conform with the circular bore of the upper ring 23". Each of the door members 33" also has a straight edge portion 41 with squared offsets, best seen in FIG. 5, which intermesh to enable the doors 33" to be coplanar when urged into their normally bore obstructing closed position.

As in the case of the embodiment of FIG. 3, use of the filter element 21" obviates the need for a special gas cap with its own door(s) as in the case of the first embodiment of FIGS. 1 and 2. The door members 33" substitute for the spring loaded normally closed door found in the entranceway of the filler tube 1 which must be kept open to permit admission of the filter element 21" into the filler tube. Hence, a conventional gas cap can also be used with the filter element 21" of the embodiment of FIG. 4.

A coil spring 43" is disposed in the bore of the filter element 21" for maintaining the cylindrical configuration thereof.

It is to be understood and appreciated that alterations, modifications and variations of and to the preferred embodiment described herein may be made without departing from the spirit and scope of the invention which is defined in the following claims.

What is claimed is:

1. Automobile gasoline impurities removal apparatus for preventing contaminants from entering the gasoline tank filler tube of an automobile, comprising:
   upper support means having means defining a bore for passing a flow of liquid and a shoulder for mounting adjacent the upper end of the filler tube of an automobile gas tank,
   filter means having a proximal end mounted on and downwardly extending from said upper support means and having an elongated mesh wall, and
   gas cap means releasably securable to the upper end of said filler tube, said cap means including means defining an axial bore having an upper end for receiving a nozzle from a gasoline pump and a lower end proximate the upper end of said upper support means, the bores of said cap means and upper support means being in substantial alignment for permitting gasoline exiting from the gasoline pump nozzle into said cap means to enter said upper support means and the bore of said filter means, and means for retaining said upper support means in a position adjacent the lower of said cap means, said retaining means rotatably mounted on said cap means for aligning the bore in said filter means with the bore in said filler tube.

2. Automobile gasoline impurities removal apparatus according to claim 1, further comprising door means movably connected to said upper support means for selectively sealing the bore in said upper support means.

3. Automobile gasoline impurities removal apparatus according to claim 1 or 2, wherein said filter means includes means defining a bore and further comprising lower support means affixed to said filter means at the distal end thereof for maintaining the shape of said bore through said filter means whereby gasoline from said pump enters the bore of said filter means and then flows through said wall into the gas tank of the automobile while filtered particles remain within said bore.

4. Automobile gasoline impurities removal apparatus according to claim 3, wherein said upper support means and said lower support means comprise cylindrical rings.

5. Automobile gasoline impurities removal apparatus according to claim 4, wherein said cap means has door means at its proximal end and urging means for normally maintaining said door means in the path of the bore in said cap means for sealing said filter from the external environment, said urging means yielding to pressure to permit said door means to move out of the path of said bore in response to insertion of said gas pump nozzle to permit gasoline to enter said filter.

6. Automobile gasoline impurities removal apparatus according to claim 5, wherein said door means comprises a plurality of planar members rotatably mounted on said cap means and said urging means comprises resilient spring means for urging said planar members into a coplanar sealing position.

7. Automobile gasoline impurities removal apparatus according to claim 1, wherein said retaining means has means defining an eccentrically disposed aperture.

8. Automobile gasoline impurities removal apparatus comprising;
   a cap member having an upper member and a lower member rotatably mounted under said upper member, said upper member having means defining a bore and said lower member having means defining an eccentrically disposed aperture in communication with said bore, and
   filter means releasably mounted on said lower member and having means defining a bore in communication with said aperture, said filter having an axis rotatable about the axis of the bore in said cap.

9. Automobile gasoline impurities removal apparatus according to claim 8, further comprising door means mounted in proximity to said cap member and means for resiliently urging said door means to at least partially seal the bore of said cap means.

10. Automobile gasoline impurities removal apparatus comprising:
    upper support means having means defining a bore adapted to pass a flow of liquid and a shoulder for mounting adjacent the entranceway to the filling spout of an automobile gas tank,
    filter means having a proximal end mounted on and downwardly extending from said upper support means and having an elongated mesh wall,
    door means having a plurality of members pivotally mounted within the bore of said upper support means for rotation between a closed position obstructing said bore and an open position providing an opening through said bore,
    spring means for urging said door means into said normally closed position and
    pusher means slidably mounted in said bore of said upper support means adjacent said door means, said pusher means having an upper surface for receiving an externally applied force within said bore of said upper support means and moving in response thereto against said door members for moving them against the force of said spring means into said open position.

11. Automobile gasoline impurities removal apparatus according to claim 10, wherein said upper support means bore is cylindrical and said pusher means comprises a cylindrical bushing having an outer diameter slightly less than the inner diameter of said upper support means.

12. Automobile gasoline impurities removal apparatus according to claim 11, wherein said door means have intermeshing edges.

13. Automobile gasoline impurities removal apparatus according to claim 10, further comprising coil spring means disposed in said filter means for maintaining the cylindrical configuration of said filter means and urging said pusher means to said closed position.

* * * * *